United States Patent [19]

Sorenson

[11] 4,236,353
[45] Dec. 2, 1980

[54] PLANT GROWING AND DISPLAY ASSEMBLY

[76] Inventor: Gordon U. Sorenson, 14934 S. E. Wanda Dr., Milwaukie, Oreg. 97222

[21] Appl. No.: 73,719

[22] Filed: Sep. 10, 1979

Related U.S. Application Data

[63] Continuation of Ser. No. 880,885, Feb. 24, 1978, abandoned.

[51] Int. Cl.³ .............................................. A01G 9/02
[52] U.S. Cl. ........................................ 47/81; 47/39; 47/66; 47/69; 47/84
[58] Field of Search ................... 47/39, 59, 63, 66, 69, 47/79–81, 84–86, DIG. 6

[56] References Cited

U.S. PATENT DOCUMENTS

| | | | |
|---|---|---|---|
| 1,474,753 | 11/1923 | Zrebiec | 47/39 |
| 2,695,474 | 11/1954 | Barstow | 47/81 |
| 2,993,300 | 7/1961 | Sawyer | 47/81 X |
| 3,066,445 | 12/1962 | D'Amico | 47/39 X |
| 3,314,194 | 4/1967 | Halleck | 47/84 X |
| 3,704,545 | 12/1972 | Van Reisen | 47/84 X |
| 3,961,444 | 6/1976 | Skaife | 47/84 X |

FOREIGN PATENT DOCUMENTS

| | | | |
|---|---|---|---|
| 1230052 | 9/1960 | France | 47/81 |
| 1414605 | 9/1965 | France | 47/80 |

*Primary Examiner*—Robert E. Bagwill
*Attorney, Agent, or Firm*—Eugene M. Eckelman

[57] ABSTRACT

A first tapered container is arranged to hold a supply of water and supports a second tapered container which contains soil and one or more plants. A wick extends up through an aperture in a lower portion of the second container and is arranged to feed water from the water supply in the first container to a plant in soil in the second container. The assembly may also include a third container which seats in inverted relation on the second conveyor. The containers used are preferably transparent and in one arrangement the first and third containers are of like size but the second container is of a wider taper to provide the selected wedging engagement of the three containers. In another arrangement the second container has an enlarged upper portion forming a downwardly facing shoulder for seated engagement on the first container. Also, the second container may have a top flange for seated engagement on the first container and furthermore may include a recess to receive the bottom edge of the third container. A holder having an apertured supporting surface for the container assemblies can be used and has a canopy with a fluorescent light for lighted display as well as for artificial lighting for the flowers.

3 Claims, 8 Drawing Figures

PLANT GROWING AND DISPLAY ASSEMBLY

This is a continuation of application Ser. No. 880,885, filed Feb. 24, 1978 now abandoned.

BACKGROUND OF THE INVENTION

This invention relates to new and useful improvements in plant growing and display assemblies.

Certain potted plants require special attention in order to grow satisfactorily. That is, such plants require controlled watering as well as controlled lighting. African violets are a good example of plants that require the controlled care. For this purpose floral outlets such as retailers have been reluctant to stock any substantial display of African violets or other flowers that require constant attention. For this same purpose, persons other than florists are also reluctant to attempt the growth of plants and especially the propagation of new plants.

SUMMARY OF THE INVENTION

According to the present invention and forming a primary objective thereof, a plant growing and display assembly is provided that maintains potted plants on display with a minimum of attention and furthermore provides a potted arrangement which makes for more convenient starting and growing of plants.

To carry out the above objectives, a potted arrangement for plants is provided employing a first container which holds a second container in upright relation. The first container holds a supply of water and the second container holds soil and a plant. A wick extends up from the water supply through an aperture in the lower portion of the second container into the area of the plant roots for watering the plant. Another container in inverted relation seats on the second conveyor. Preferably, all three containers are transparent in order to provide visual inspection therein. The potted assembly can be used with a holder having an apertured bottom wall arranged to support the assemblies of containers. The holder also employs a canopy with a fluorescent light fixture supported thereon.

The invention will be better understood and additional objects and advantages will become apparent from the following description taken in connection with the accompanying drawings.

DETAILED DESCRIPTION OF A PREFERRED EMBODIMENT

Figure 3:
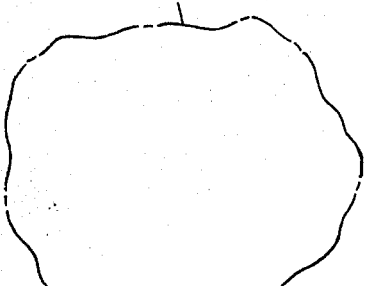
FIG. 3 is a sectional view of a potted plant structure forming a part of the present invention.
Figure 3:
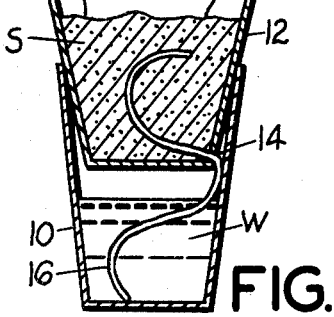
Figure 4:
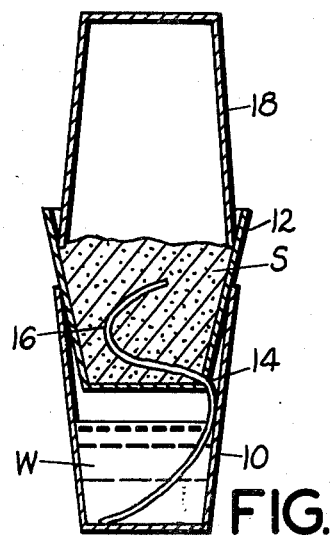
FIG. 4 is a view similar to FIG. 3 showing the addition of a third container in the assembly.

With reference first to FIGS. 3 and 4 which show in detail a first potted arrangement for plants, the numeral 10 designates a first or base container and the numeral 12 designates a second or supported container. Container 10 is tapered to a larger dimension toward its upper end and container 12 is similarly tapered but with a wider taper so that it seats in the container 10 in wedging relation with the bottom thereof above the bottom of the latter container.

Container 10 supports a supply of water W and container 12 is filled with soil S. Container 12 has an aperture 14 in a lower portion thereof, preferably in the side wall adjacent the bottom, and a wick 16 projects through such aperture. This wick has a lower end immersed in the water and an upper end disposed in a suitable location in the soil to water the roots of a plant P planted in the soil.

The two containers 10 and 12 may be associated with a third or covering container 18 when it is desired that a protective covering or terrarium effect is to be used. This arrangement may be desired when a small plant is first started in the container 12 and requires cover, such as in the initial propagaation of plants. Container 18 is also tapered to a larger dimension toward its open end and is seated on the container 12 in inverted relation. The diameter of the container 18 at its open end is less than the diameter of the upper end of container 12 so that it seats in wedging relation at a point slightly below the upper end of the container 12.

In a preferred arrangement, the three containers 10, 12 and 18 are transparent. Such allows good viewing of the water supply, the soil, and the plant. The assembly shown in FIG. 4 is readily accomplished by utilizing containers 10 and 18 of identical size and shape and using a container 12 of shorter height and of a wider taper. This arrangement provides the selected wedging engagement of the containers and in addition provides a substantially stable vertical assembly. Such containers may be constructed of a transparent plastic to accomplish the desired features and also to provide an assembly which is inexpensive to manufacture.

Figure 5:
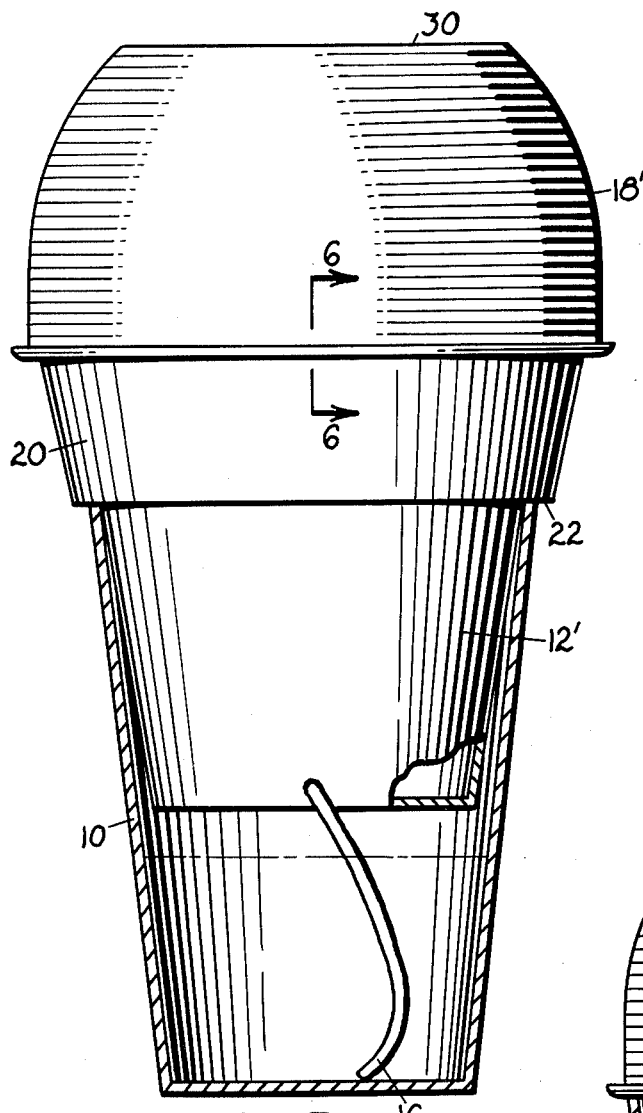
FIG. 5 is an elevational view, partly in section, showing a second embodiment of the invention.
Figure 6:
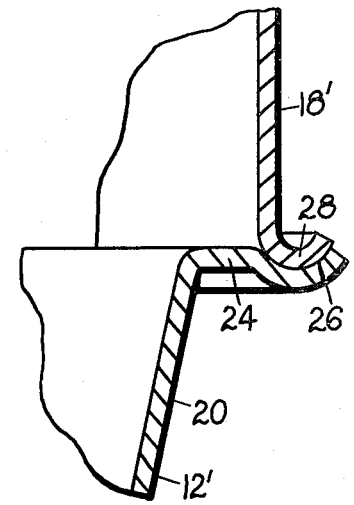
FIG. 6 is an enlarged fragmentary sectional view taken on the line 6—6 of FIG. 5.

Another form of container arrangement is shown in FIGS. 5 and 6. In this arrangement, a bottom container 10 of the same structure as shown in FIGS. 3 and 4 is used but the second container 12' instead of having wedging engagement with the container 10 has an enlarged top portion 20 providing a downwardly facing shoulder 22 that seats on the top edge of container 10. The top of enlarged portion 20 has a peripheral outwardly directed flange 24 having an upwardly facing recess 26 at its outer edge. In the arrangement of FIGS. 5 and 6, a third inverted container 18' is also used, and the bottom edge 28 of this third container is arranged to engage recess 26. The bottom edge of the container 18' may be rolled back or rounded for fitted engagement 26 in recess. The engaging relation of these three containers provides a stable assembly.

In a preferred arrangement, the top surface 30 of third container 18' is flat and may serve as a container that will seat on a flat surface if it is desired that it be used for other purposes. The assembly of containers 10, 12' and 18' is the same as in FIG. 3 for the support of water, soil, and for providing a cover, the container 12' likewise having a wick 16 projecting therefrom.

Figure 8:
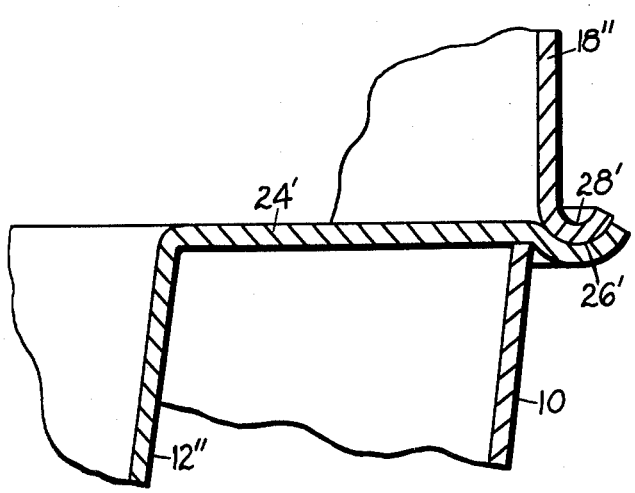
FIG. 8 is an enlarged fragmentary sectional view taken on the line 8—8 of FIG. 7.
Figure 7:
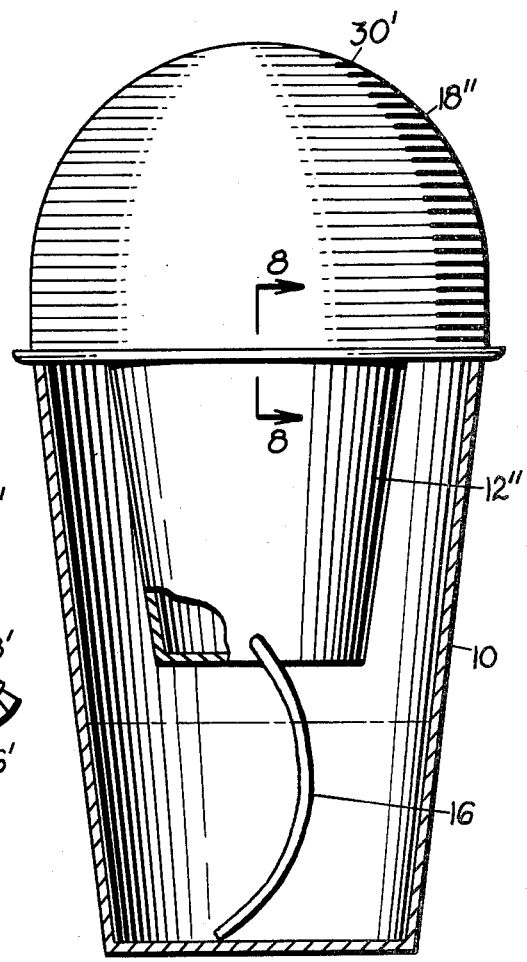
FIG. 7 is an elevational view, partly in section, and showing a further form of the invention.

FIGS. 7 and 8 show another arrangement of containers. In this arrangement, the same basic container 10 is used. However, the second container 12" is of substantially smaller dimension for the purpose of raising small plants. The second container 12" has a wide outwardly turned flange 24' on the top thereof for seated engagement on the top edge of container 10. Flange 24' has an annular recess 26' at the outer edge thereof which is engaged by an outwardly rolled or rounded portion 28' of a third container 18". This latter container may have a rounded top surface 30' as shown in FIG. 7 or may have a flat surface as shown in FIG. 5. Container 10 is arranged to hold water and second container 12' with a wick 16 projecting therefrom is arranged to hold soil as in other embodiments.

Figure 1:
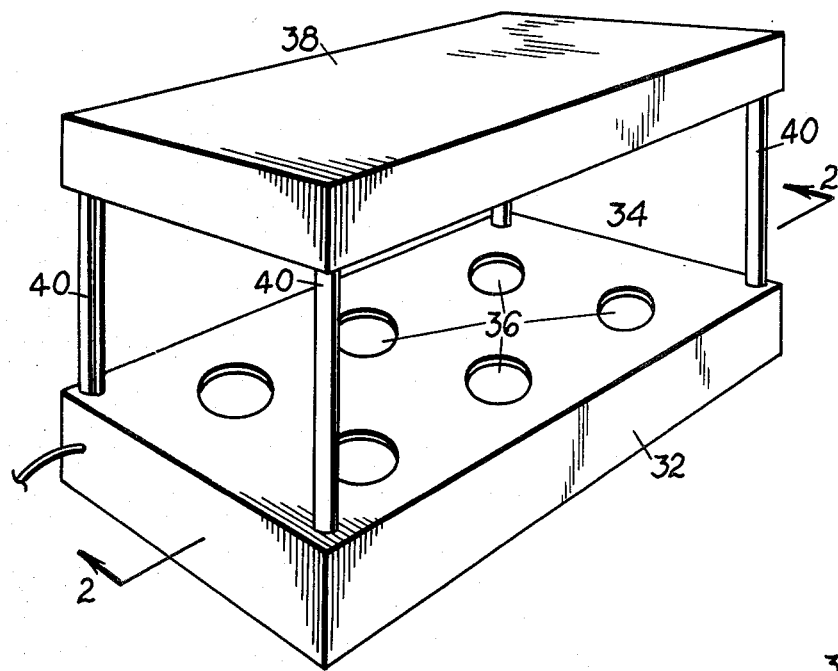
FIG. 1 is a perspective view of a holder which may form a part of the instant invention.
Figure 2:
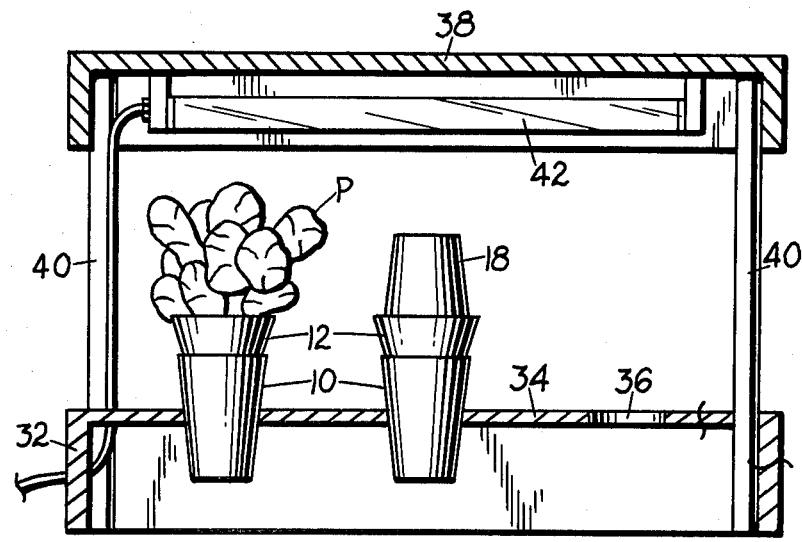
FIG. 2 is a longitudinal sectional view taken on the line 2—2 of FIG. 1.

With reference to FIGS. 1 and 2, the assembly of FIGS. 3-8 may be associated with a holder 32 which has an elevated bottom wall 34 with a plurality of apertures 36 therein. Apertures 36 are of selected size so as to hold containers 10 above a supporting surface such as a table. Holder 32 thus provides a support for a plurality of the container assemblies in a stable and protected position.

Holder 32 has a canopy or top wall 38 supported on corner posts 40 which not only provides an attractive appearance but also provides a support for one or more fluorescent light fixtures 42. Such light fixture is used for lighted display of the plants as well as for producing artificial lighting if required.

The present invention thus provides a plant growing and display assembly which not only is useful in starting plants but also is useful for holding plants on display or otherwise with only a minimum of attention required. That is, by supplying container 10 with water, and a liquid fertilizer if desired, it is only necessary to inspect the assembly every week or two. When used in combination with a holder such as shown in FIGS. 1 and 2, floral retail outlets can stock plants which otherwise are not stocked because of the frequent attention that is required. All the containers in the assembly are of a nesting structure for compactness in shipment and storage.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. A plant growing and display assembly comprising
   (a) a transparent, open top first container arranged to hold a supply of water,
   (b) said first container being tapered to a smaller dimension from top to bottom,
   (c) a transparent, open top second container arranged to hold a supply of plant growth material and plants,
   (d) said second container being tapered to a smaller dimension from top to bottom and being of a selected larger diameter than said first container whereby to seat in said first container in a releasable wedging fit with a lower portion of said second container extending down into said first container but terminating above the bottom of said first container,
   (e) said second container having an aperture adjacent to a lower portion thereof,
   (f) a wick extending through said aperture and having an end portion thereof immersed in the water supply in said first container and another end portion thereof extending up in said second container in a location to feed water to a plant in the plant growth material,
   (g) and a transparent open top third container of substantially the same size and taper as said first container,
   (h) said third container being inverted and having a releasable wedging fit in said second container and forming a terrarium effect for plants in said second container.

2. The plant growing and display assembly of claim 1 including a holder having a bottom supporting end and a horizontal wall supported above said bottom supporting end, said horizontal wall having a plurality of apertures therein of a selected size supporting a plurality of said first containers in releasable wedging relation with the bottom of said first containers being disposed above said bottom supporting end and the top of said first containers being disposed above the top of said wall.

3. The plant growing and display assembly of claim 2 wherein said holder includes a canopy-type top thereon supported on upright posts on said bottom supporting end, and a fluorescent light fixture mounted on the undersurface of said top for providing an artificial light for plants in containers supported in the holder.

* * * * *